(12) United States Patent
Harigovindan et al.

(10) Patent No.: US 11,396,950 B2
(45) Date of Patent: Jul. 26, 2022

(54) CHECK VALVE ASSEMBLY HAVING A POPPET

(71) Applicant: THE BOEING COMPANY, Chicago, IL (US)

(72) Inventors: Vasudevan Harigovindan, Karnataka (IN); Aswin Chandar N C, Karnataka (IN)

(73) Assignee: THE BOEING COMPANY, Chicago, IL (US)

( * ) Notice: Subject to any disclaimer, the term of this patent is extended or adjusted under 35 U.S.C. 154(b) by 181 days.

(21) Appl. No.: 16/808,578

(22) Filed: Mar. 4, 2020

(65) Prior Publication Data
US 2021/0278003 A1 Sep. 9, 2021

(51) Int. Cl.
| | | |
|---|---|---|
| F16K 15/02 | (2006.01) | |
| F16K 1/36 | (2006.01) | |
| B64C 25/22 | (2006.01) | |
| F15B 13/02 | (2006.01) | |
| F16K 15/06 | (2006.01) | |

(52) U.S. Cl.
CPC ............ *F16K 15/026* (2013.01); *B64C 25/22* (2013.01); *F15B 13/027* (2013.01); *F16K 1/36* (2013.01); *F16K 15/063* (2013.01); *F15B 2211/30505* (2013.01); *F16K 2200/401* (2021.08); *Y10T 137/7848* (2015.04)

(58) Field of Classification Search
CPC .... F16K 15/025; F16K 15/026; F16K 15/063; F16K 2200/401; Y10T 137/7848; Y10T 137/7929
See application file for complete search history.

(56) References Cited

U.S. PATENT DOCUMENTS

| | | | | |
|---|---|---|---|---|
| 270,250 | A * | 1/1883 | Richards et al. ..... | F16K 15/063 137/542 |
| 4,213,021 | A * | 7/1980 | Alexander .......... | F16K 37/0033 137/540 |
| 5,848,605 | A * | 12/1998 | Bailey ................... | F16K 15/063 137/540 |
| 5,918,628 | A * | 7/1999 | Harding ................ | F16K 15/026 137/512.1 |
| 9,644,356 | B1 * | 5/2017 | Gass ...................... | F16K 15/025 |
| 2016/0348628 | A1 * | 12/2016 | Bean ....................... | F16K 47/00 |

FOREIGN PATENT DOCUMENTS

GB        565291 A * 11/1944 ........... F16K 15/025

* cited by examiner

*Primary Examiner* — Kevin F Murphy
(74) *Attorney, Agent, or Firm* — The Small Patent Law Group LLC; Joseph M. Butscher

(57) ABSTRACT

A poppet of a check valve includes a base, a shaft extending from the base, and a sealing head coupled to the shaft and extended away from the base by the shaft. A flow channel is defined between the base, the shaft, and the sealing head. The base includes a plurality of holes.

21 Claims, 8 Drawing Sheets

CHECK VALVE ASSEMBLY HAVING A POPPET

FIELD OF EMBODIMENTS OF THE DISCLOSURE

Embodiments of the present disclosure generally relate to check valve assemblies, and more particularly to poppets of check valve assemblies, and methods of forming poppets.

BACKGROUND OF THE DISCLOSURE

Check valves or relief valves are used to allow fluid flow in one direction. That is, a typical check valve normally allows flows flow of fluid (whether liquid or gas) in one direction, but generally restricts or even prevents flow of fluid in an opposite direction. Check valves are commonly used in hydraulic systems, such as within vehicles. For example, hydraulic systems of landing gear of aircraft often include check valves. In particular, one or more hydraulic systems may power landing gear, brakes, and flight controls of an aircraft. Check valves are used across the hydraulic systems.

Certain known check valves include a housing and a spring-biased poppet within the housing. Typical poppets include a seat that sealingly engages an interior wall or other such structure within the housing. The poppets also include fluid holes to counterbalance back pressure, and allow for fluid cross flow.

FIG. 1 illustrates a perspective view of a known poppet 10. The poppet 10 includes a sealing head 12 and a conic or beveled neck 14 extending from the sealing head 12. The neck 14 radially angles from the sealing head 12. Holes 16 are formed through the neck 14. The holes 16 allow for fluid to flow therethrough.

The process of forming the holes 16 through the neck 14 is time and labor intensive. In particular, of the beveled nature of the neck 14, special machining is typically used to form the holes 16. In short, the size and shape of the neck 14 is relatively complex, which typically requires a costly and labor-intensive process of forming the holes 16 through the neck 14.

SUMMARY OF THE DISCLOSURE

A need exists for a poppet for a check valve that can be efficiently and cost-effectively manufactured. Further, a need exists for a simplified poppet that can be quickly and easily manufactured without the need for specialized tooling.

With those needs in mind, certain embodiments of the present disclosure provide a poppet of a check valve. The poppet includes a base, a shaft extending from the base, and a sealing head coupled to the shaft and extended away from the base by the shaft. A flow channel is defined between the base, the shaft, and the sealing head.

The base includes a plurality of holes that counterbalance back pressure for the check valve. The plurality of holes extend through a flat surface of the base. The shaft extends from the flat surface. The plurality of holes extend to an internal cavity of the base. In at least one embodiment, the plurality of holes are linearly formed by a forming tool operating from the internal cavity to and through the flat surface of the base. Each of the plurality of holes may have a central axis that is perpendicular to the flat surface of the base. In at least one embodiment, the internal cavity is defined by a ceiling that is conic.

In at least one embodiment, the plurality of holes are positioned around a root of the shaft that connects to the base. The shaft can be axially centered about a longitudinal axis of the poppet.

In at least one embodiment, the shaft has a first diameter, and the sealing head has a second diameter that is greater than the first diameter.

In at least one embodiment, the sealing head includes at least one orifice, such as for restricted flow.

In at least one embodiment, the poppet is disposed in a check valve for a hydraulic system for landing gear of an aircraft.

Certain embodiments of the present disclosure provide a method of forming a poppet of a check valve. The method includes extending a shaft from a base; coupling a sealing head to the shaft, wherein said coupling extends the sealing head away from the base; and defining a flow channel between the base, the shaft, and the sealing head.

In at least one embodiment, the method also includes forming a plurality of holes in the base. For example, said forming includes forming the plurality of holes through a flat surface of the base, and extending the plurality of holes to an internal cavity of the base. In at least one embodiment, said forming includes linearly forming the plurality of holes by a forming tool operating from the internal cavity to and through the flat surface of the base.

In at least one embodiment, said forming includes positioning the plurality of holes around a root of the shaft that connects to the base. Said extending may include axially centering the shaft about a longitudinal axis of the poppet.

The method may also include forming at least one orifice through a portion of the sealing head.

Certain embodiments of the present disclosure provide a check valve including a housing having a central chamber, a spring seat secured within the central chamber, a biasing spring extending from the spring seat, and a poppet secured within the central chamber. The spring exerts a biasing force into the poppet.

DETAILED DESCRIPTION OF THE DISCLOSURE

The foregoing summary, as well as the following detailed description of certain embodiments, will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Certain embodiments of the present disclosure provide a check valve including a poppet. The poppet has a simplified sealing-seat including a shaft coupled to a sealing head. Straight, linear holes are formed through a portion of the poppet. The holes can be formed with a drill, for example, instead of complex tooling that is used to form holes through beveled surfaces (as with prior known poppets). As such, the poppet can be quickly and easily manufactured without specialized and complex tooling, thereby reducing manufacturing time and costs.

The poppet includes a sealing head coupled to a shaft that is in turn coupled to a base. In at least one embodiment, an upper surface of the base is flat. A flow channel is formed between the sealing head, the shaft and the base. The flow channel allows for cross flow of fluid. Holes are formed through the base. In particular, the holes are formed through the upper surface of the base and extend to an internal cavity of the base. The holes are configured to counterbalance back pressure. The holes may be quickly and easily formed through the base, such as via a forming tool, such as a drill.

Certain embodiments of the present disclosure provide a poppet for a check valve. The poppet is configured to control the flow of fluid through the check valve. The poppet includes a shaft extending from a base, and a sealing seat located on an opposite end of the shaft. A plurality of holes are located around the shaft on the base. In at least one embodiment, an internal cavity of the base of the poppet has a cone shaped tip.

The holes are configured to counterbalance back pressure. In at least one embodiment, the holes are drilled vertically so that each hole is perpendicular to a flat outer surface of the base.

Check valves including poppets as described herein may be used with various hydraulic systems. For example, the check valves may be used with hydraulic system manifolds of aircraft. In at least one embodiment, the check valves may be used with hydraulic system manifolds for landing gear of aircraft. For example, a poppet as described herein may be disposed in a check valve for a hydraulic system for landing gear of an aircraft.

Figure 1:
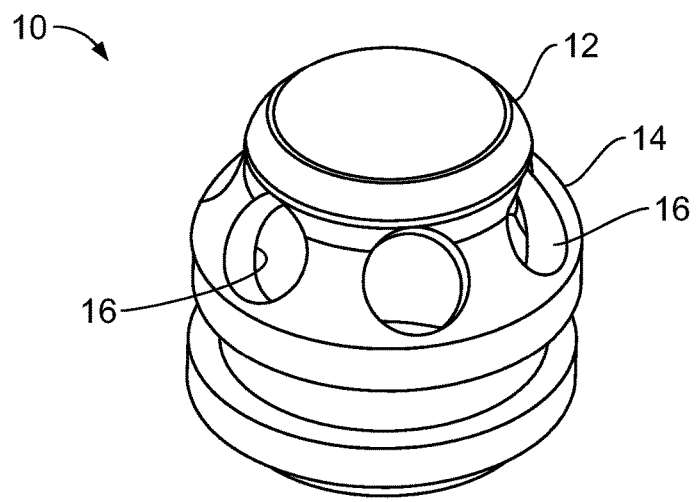
FIG. 1 illustrates a perspective view of a known poppet.
Figure 2:
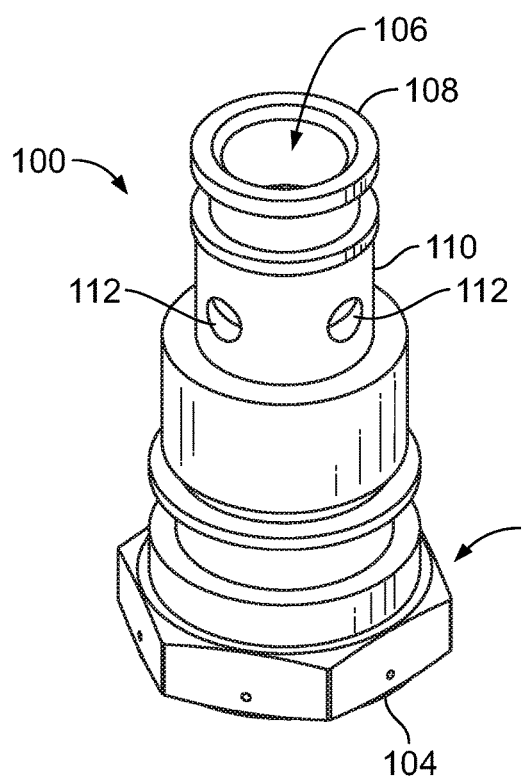
FIG. 2 illustrates a perspective view of a check valve, according to an embodiment of the present disclosure.
Figure 3:
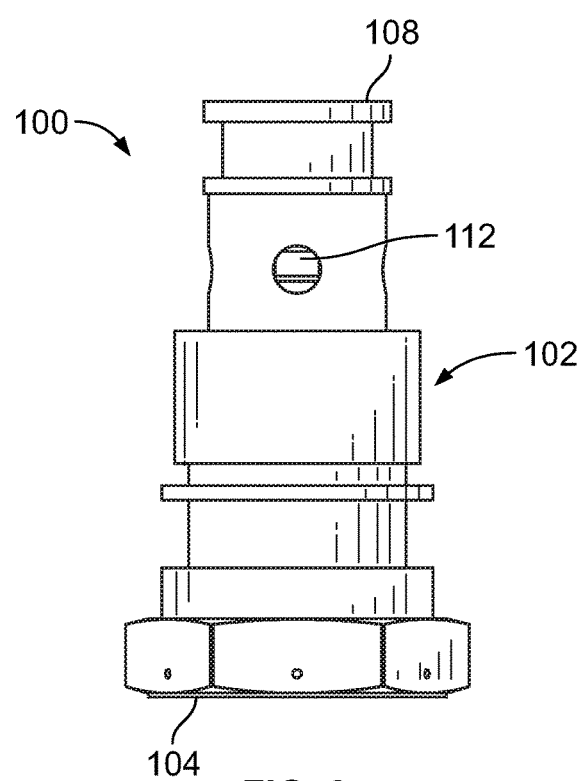
FIG. 3 illustrates a lateral view of the check valve of FIG. 2.
Figure 4:
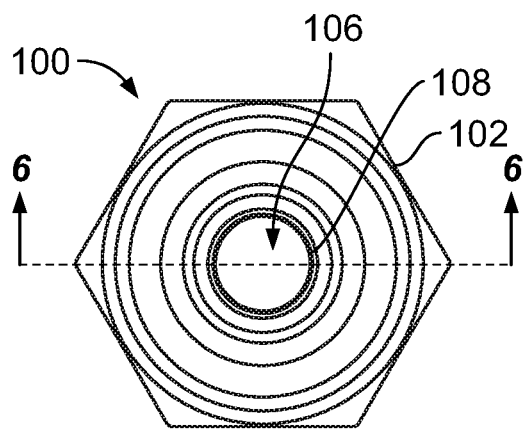
FIG. 4 illustrates a top view of the check valve of FIG. 2.
Figure 5:
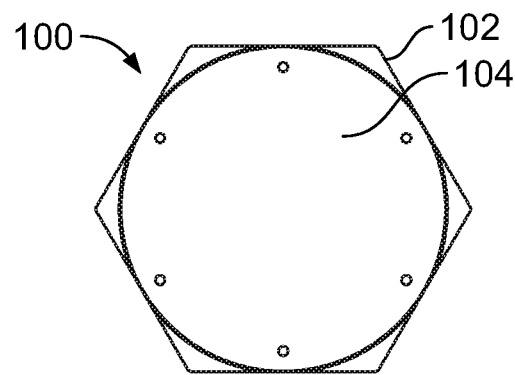
FIG. 5 illustrates a bottom view of the check valve of FIG. 2.

FIG. 2 illustrates a perspective view of a check valve 100, according to an embodiment of the present disclosure. FIG. 3 illustrates a lateral view of the check valve 100 of FIG. 2. FIG. 4 illustrates a top view of the check valve 100 of FIG. 2. FIG. 5 illustrates a bottom view of the check valve 100 of FIG. 2. Referring to FIGS. 2-5, the check valve 100 includes a housing 102 including a closed end 104 and a fluid inlet 106 at an open end 108 opposite from the closed end 104. The housing 102 includes a tube 110 having a plurality of flow passages 112.

Figure 6:
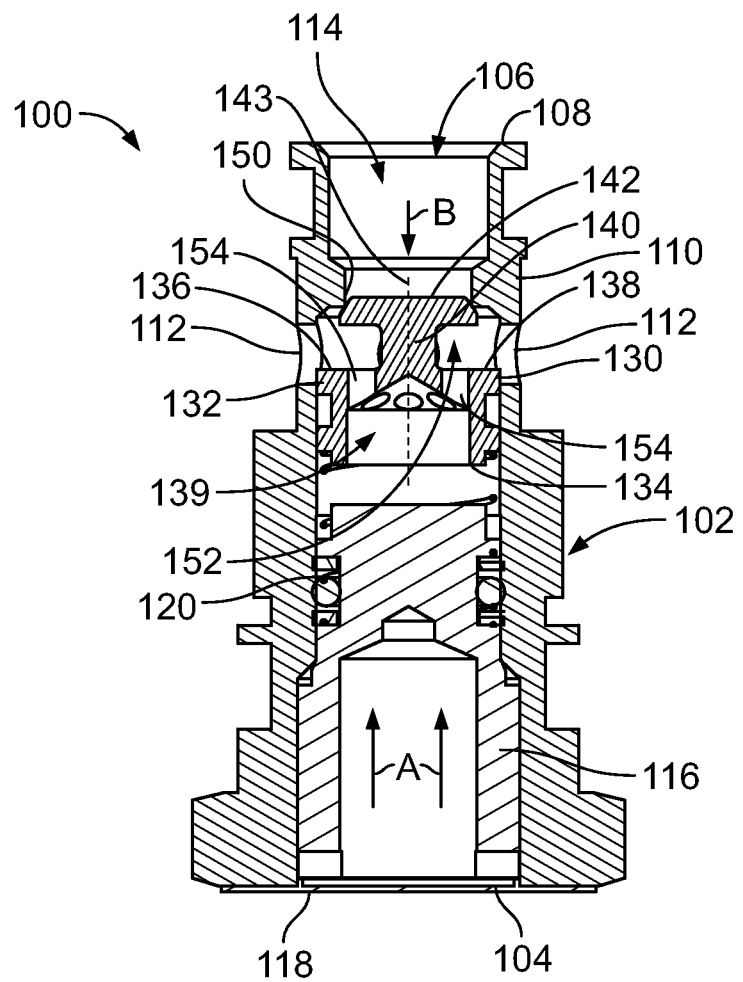
FIG. 6 illustrates a cross-sectional view of the check valve through line 6-6 of FIG. 4.

FIG. 6 illustrates a cross-sectional view of the check valve 100 through line 6-6 of FIG. 4. A central chamber 114 is formed through the housing 102 from the fluid inlet 106 to the closed end 104. A spring seat 116 is secured within the central chamber 114. For example, the spring seat 116 is secured within the central chamber 114 and may abut against a cap 118 that covers the closed end 104. A biasing spring 120 is coupled to the spring seat 116 and exerts a biasing force into a poppet 130 that is secured within the central chamber 114. The biasing spring 120 urges the poppet 130 towards the fluid inlet 106.

The poppet 130 includes a base 132 having a first end 134 that receives the biasing spring 120 and a second end 136 having a flat surface 138 (that is, an outer flat surface). An internal cavity 139 is formed within the base 132. A shaft 140 extends from the second end 136 of the base 132. In particular, the shaft 140 extends from the flat surface 138 of the base 132. In at least one embodiment, the shaft 140 is axially centered about a longitudinal axis 143 of the poppet 130. A sealing head 142 radially extends from the shaft 140 opposite from the base 132.

The sealing head 142 sealingly engages an internal diameter 150 of the housing 102 proximate to the open end 108. A flow channel 152 is formed between the sealing head 142, the shaft 140 and the base 132. In at least one embodiment, the flow channel 152 is an open path that extends around the shaft 140 between the sealing head 142 and the base 132. The flow channel 152 allows for fluid to flow through and between the flow passages 112 of the housing 102. Holes 154 are formed through the base 132. The holes 154 are formed through the flat surface 138 of the second end 136 of the base 132 and extend to the internal cavity 139. The holes 154 are configured to counterbalance back pressure. The holes 154 may be quickly and easily formed through the base 132, such as via a drill, in a single, linear direction as represented by lines A.

In operation, fluid is able to flow between and through the flow passages 112 through the flow channel 152. The spring 120 biases the sealing head 142 into the internal diameter 150 of the housing 102, thereby preventing or otherwise restricting fluid flow through the sealing head 142 in the direction of arrow B. If fluid pressure is great enough to overcome the force of the biasing spring 120, the sealing head 142 may unseat from the internal diameter 150, thereby allowing fluid flow past the sealing head 142 in the direction of arrow B, such that the holes 154 counterbalance the back pressure, and the biasing spring 120 continues to exert the biasing force to re-seat the sealing head 142 onto the internal diameter 150.

Figure 7:
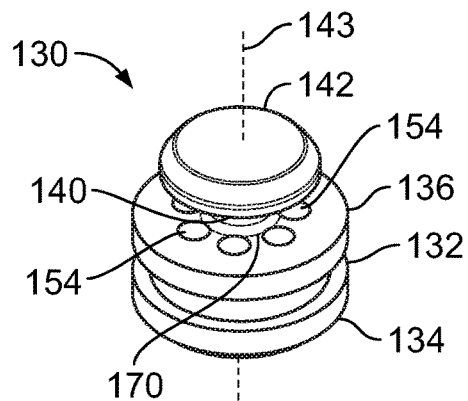
FIG. 7 illustrates a perspective view of a poppet, according to an embodiment of the present disclosure.
Figure 8:
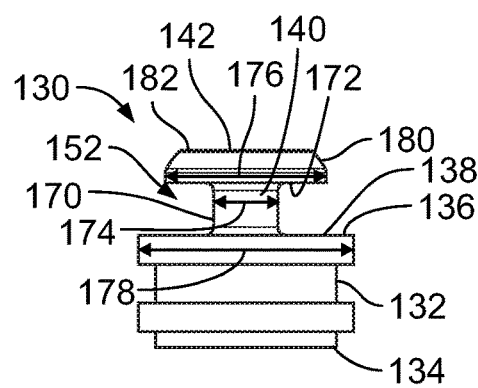
FIG. 8 illustrates a lateral view of the poppet of FIG. 7.

FIG. 7 illustrates a perspective view of the poppet 130, according to an embodiment of the present disclosure. FIG. 8 illustrates a lateral view of the poppet 130 of FIG. 7. Referring to FIGS. 7 and 8, the poppet 130 includes the base 132 having the first end 134 and the second end 136 having the flat surface 138. In at least one embodiment, the flat surface 138 has a circular axial cross-section. The holes 154 are formed through the flat surface 138 and are positioned around a root 170 of the shaft 140 that connects to the flat surface 138 of the base 132. The shaft 140 can have a circular axial cross-section. The poppet 130 can include more or less holes 154 than shown.

The shaft 140 includes the root 170 extending from the flat surface 138 of the base 132, to a flat underside 172 of the sealing head 142. As shown, a diameter 174 of the shaft 140 is less than a diameter 176 of the flat underside 172 of the sealing head 142. The diameter of the sealing head 142 is greater than the diameter of the shaft 140. In turn, the diameter 176 of the flat underside 172 of the sealing head 142 may be less than a diameter 178 of the flat surface 138 of the base 132. That is, the diameter of the base 132 may be greater than the diameter of the sealing head 142. The flow channel 152 is formed between the flat surface 138, an outer surface of the shaft 140, and the flat underside 172 of the sealing head 142.

An outer circumference of the sealing head 142 includes a rounded edge 180 that is configured to provide a sealing interface with the internal diameter 150 of the housing 102 of the check valve 100 (shown in FIG. 6). A cap 182 of the sealing head 142 can be flat. The cap 182 is opposite the flat underside 172.

Figure 9:
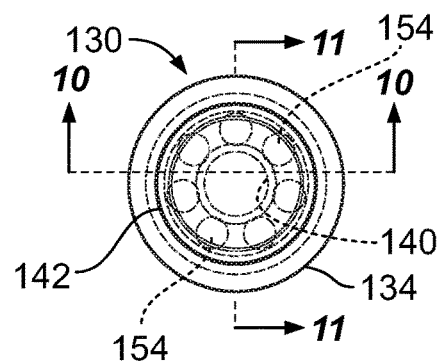
FIG. 9 illustrates a top view of the poppet of FIG. 7.
Figure 10:
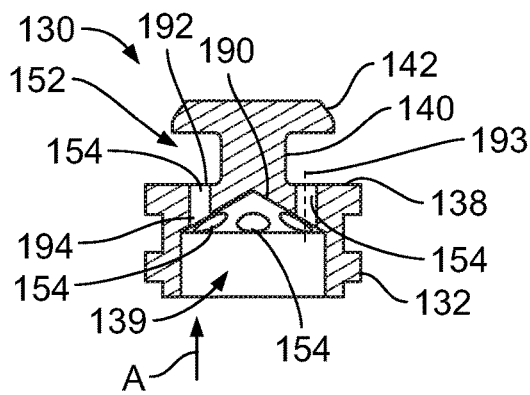
FIG. 10 illustrates a cross-sectional view of the poppet through line 10-10 of FIG. 9.
Figure 11:
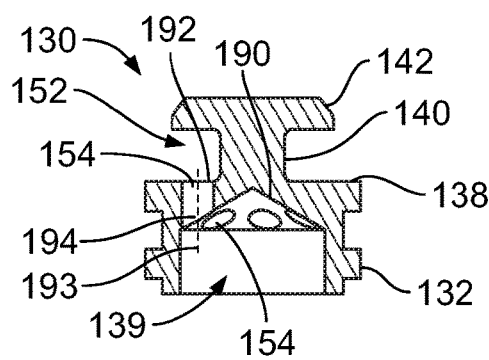
FIG. 11 illustrates a cross-sectional view of the poppet through line 11-11 of FIG. 9.

FIG. 9 illustrates a top view of the poppet 130 of FIG. 7. FIG. 10 illustrates a cross-sectional view of the poppet 130 through line 10-10 of FIG. 9. FIG. 11 illustrates a cross-sectional view of the poppet 130 through line 11-11 of FIG. 9. Referring to FIGS. 9-11, the internal cavity 139 is formed within the base 132. A ceiling 190 of the internal cavity 139 may be conic. That is, the internal cavity 139 may be defined by a ceiling 190. In at least one other embodiment, the ceiling 190 of the internal cavity 139 may be other than conic. For example, the ceiling 190 may be flat or semi-spherical.

The holes 154 are linearly formed through the base 132 between and through the flat surface 138 and the ceiling 190. Each hole 154 includes a flat circular end 192 formed through the flat surface 138 of the base 132, and an opposite angled end 194 formed through the ceiling 190 (for example, a conic ceiling). Each of the plurality of holes 154 has a central axis 193 (see FIG. 11) that is perpendicular to the flat surface 138 of the base 132. Instead of using specialized tooling to form, the hole 154 are quickly, easily, and cost-effectively formed through a drill, for example, in a linear direction in the direction of arrow A. In this manner, the poppet 130 can be initially formed, such as within a mold, and an operative head of a drill can be positioned below the internal cavity 139 and moved linearly from the ceiling 190 (for example, a conic ceiling) to the flat surface 138 in the direction of arrow A to efficiently and cost-effectively form the holes 154.

As described, the poppet 130 includes the base 132, the shaft 140 extending from the base 132, and the sealing head 142 coupled to the shaft 140 and extended away from the base 132 by the shaft 140. The flow channel 152 is defined between the base 132, the shaft 140, and the sealing head 142. The base 132 includes the plurality of holes 154. The holes 154 extend through the flat surface 138 of the base 132. The shaft 140 extends from the flat surface 138. The holes 154 extend to the internal cavity 139 of the base 132. The holes 154 may be linearly formed by a forming tool (such as a drill) operating from the internal cavity 139 to and through the flat surface 138 of the base 132. Accordingly, the holes 154 may have central axes that are perpendicular to the flat surface 138 of the base 132.

As described herein, the poppet 130 provides an efficient and cost-effective design that does not include complex outer surfaces that result in the use of specialized and costly tooling to form the holes 154. Instead, the shaft 140 extends the sealing head 142 away from the flat surface 138, thereby providing the flow channel 152, and the holes 154 are formed around the root 170 of the shaft 140 through the flat surface 138 of the base 132. Therefore, the formation process and tooling for the formation of the disclosed poppet can be less complex than the formation process and the tooling for conventional poppets.

Figure 12:
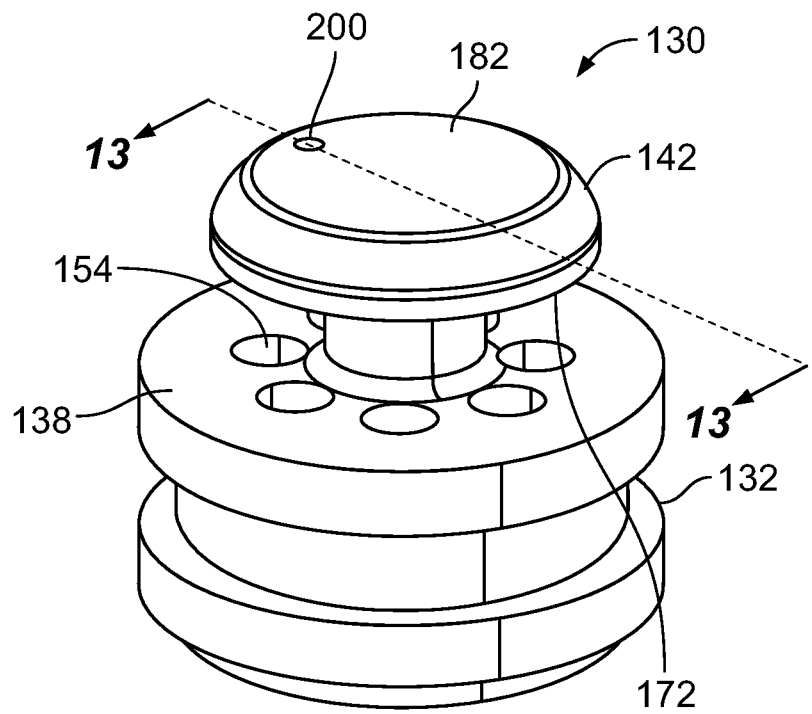
FIG. 12 illustrates a perspective view of a poppet, according to an embodiment of the present disclosure.
Figure 13:
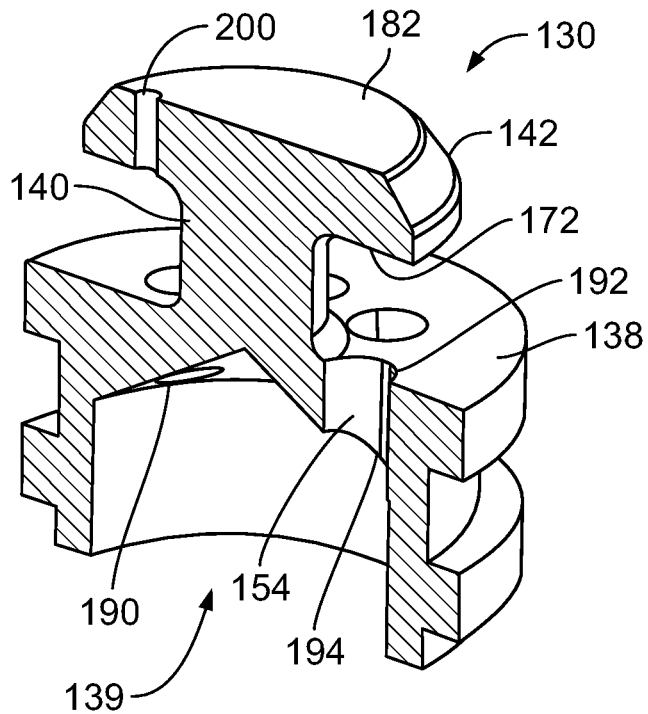
FIG. 13 illustrates a perspective cross-sectional view of the poppet through line 13-13 of FIG. 12.

FIG. 12 illustrates a perspective view of the poppet 130, according to an embodiment of the present disclosure. FIG. 13 illustrates a perspective cross-sectional view of the poppet 130 through line 13-13 of FIG. 12. The poppet 130 shown in FIGS. 12 and 13 is similar the poppet 130 shown in FIGS. 6-11, except that an orifice 200 may be formed through the sealing head 142 between the underside 172 and the cap 182. The orifice 200 is a linear passage extending through the sealing head 142. The orifice 200 is sized and shaped to provide a desired amount of fluid flow through the sealing head 142. In this manner, the poppet 130 may be used in the housing 102 (shown in FIG. 6) to provide a restrictor valve. In an example, the orifice 200 is an orifice for restricted flow. Optionally, the poppet 130 may include additional orifices.

Figure 14:
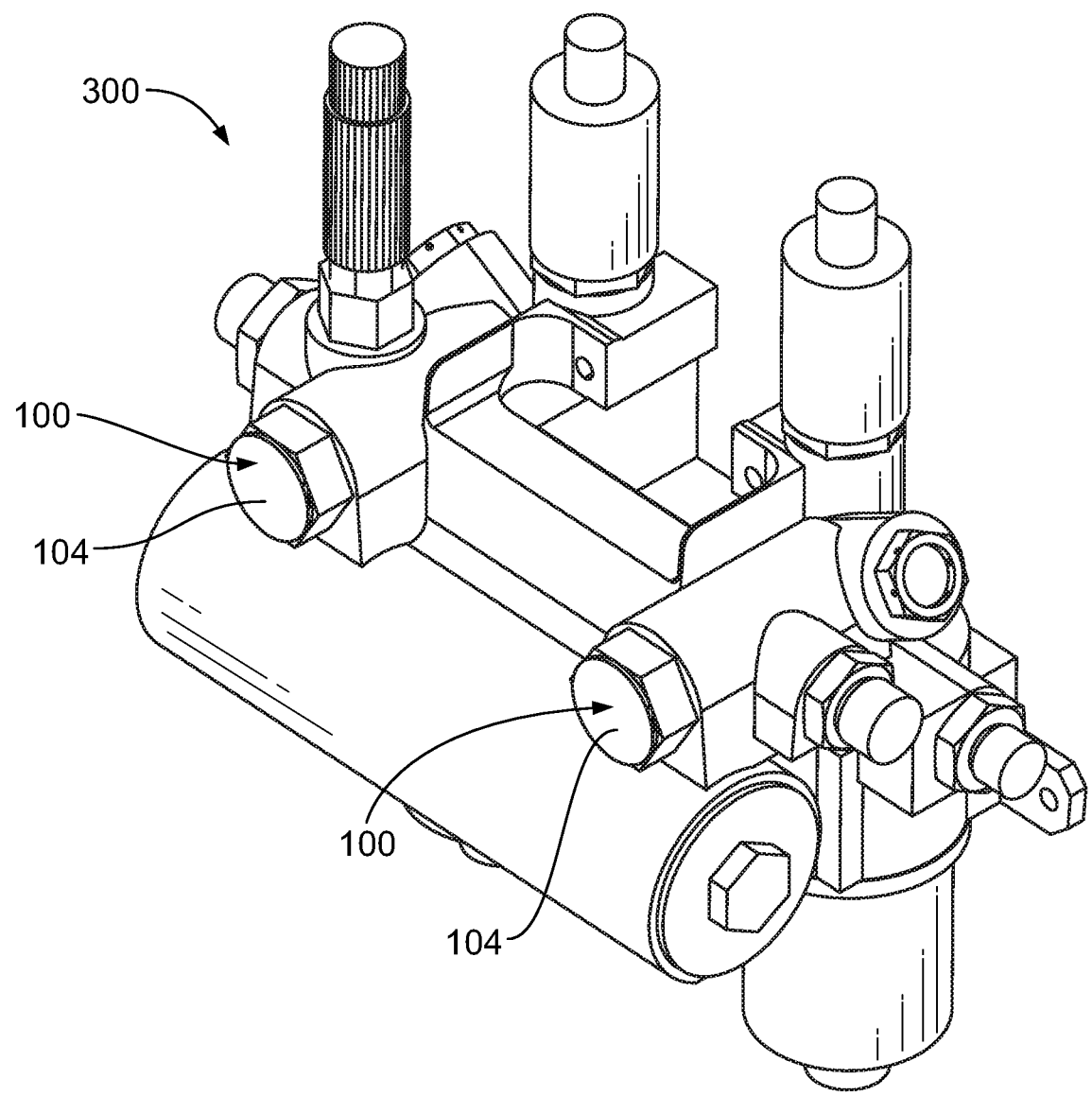
FIG. 14 illustrates a perspective view of a hydraulic manifold module, according to an embodiment of the present disclosure.

FIG. 14 illustrates a perspective view of a hydraulic manifold module 300, according to an embodiment of the present disclosure. The hydraulic manifold module 300 is an example of a system that includes one or more check valves 100. The check valves 100 include poppets 130 (shown in FIGS. 6-13) as described herein. The hydraulic manifold module 300 may include more or less check valves 100 than shown. The hydraulic manifold module 300 may be used with one or more systems of a vehicle. For example, the hydraulic manifold module 300 may be part of landing gear of an aircraft. Further, the poppets 130 may be disposed in the check valves 100 for a hydraulic system for landing gear of an aircraft.

Figure 15:
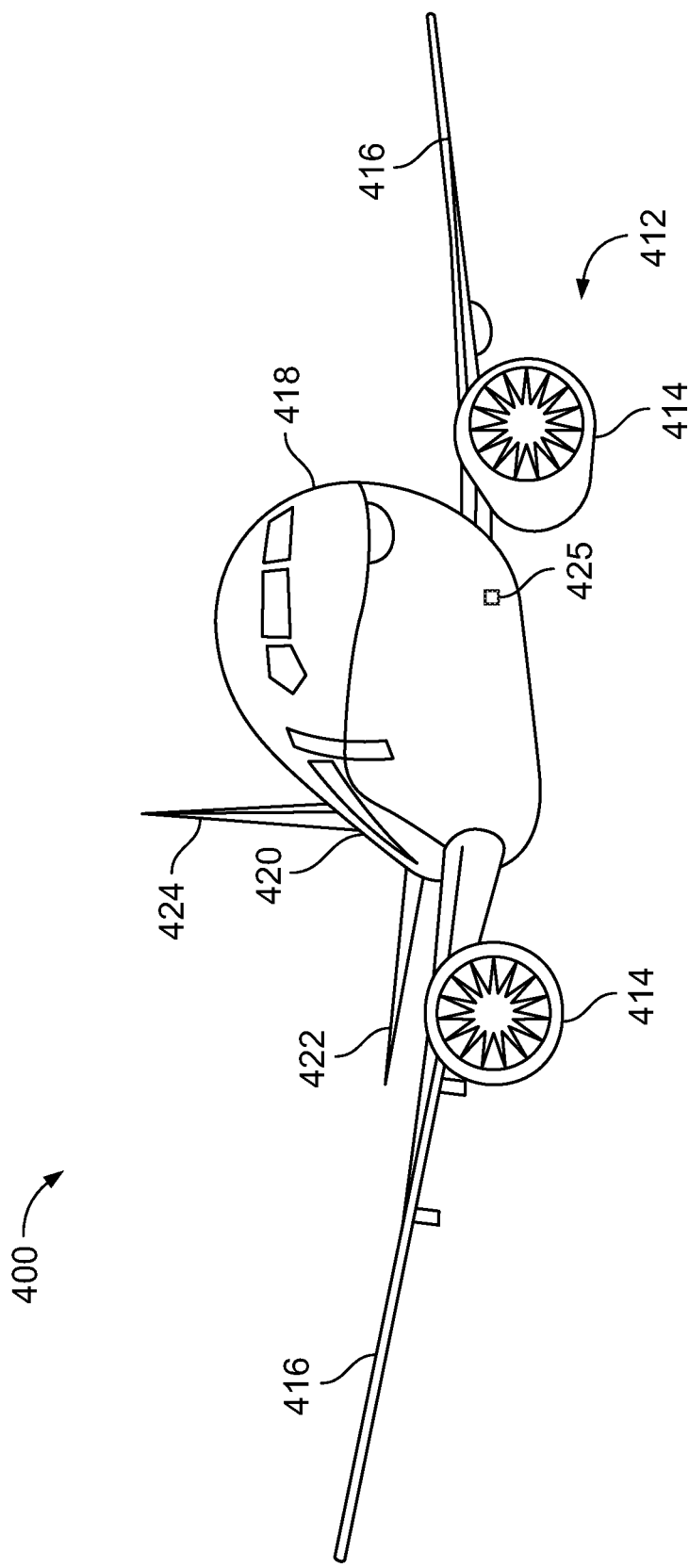
FIG. 15 illustrates a perspective front view of an aircraft, according to an embodiment of the present disclosure.

FIG. 15 illustrates a perspective top view of a vehicle, such as an aircraft 400, according to an embodiment of the present disclosure. The aircraft 400 includes a propulsion system 412 that includes two engines 414, for example. Optionally, the propulsion system 412 may include more engines 414 than shown. The engines 414 are carried by wings 416 of the aircraft 400. In other embodiments, the engines 414 may be carried by a fuselage 418 and/or an empennage 420. The empennage 420 may also support horizontal stabilizers 422 and a vertical stabilizer 424.

The aircraft 400 includes various fluid systems, such as hydraulic systems, that may include one or more check valves that include poppets, as described herein. For example, the aircraft 400 includes landing gear 425 that may include one or more check valves that include poppets, as described herein.

Alternatively, instead of an aircraft, embodiments of the present disclosure may be used with various other vehicles, such as automobiles, buses, locomotives and train cars, seacraft, spacecraft, and the like. Further, embodiments of the present disclosure may be with components, whether in a vehicle or not. For example, embodiments of the present disclosure may be used with liquid and/or gas systems within a fixed structure.

Figure 16:
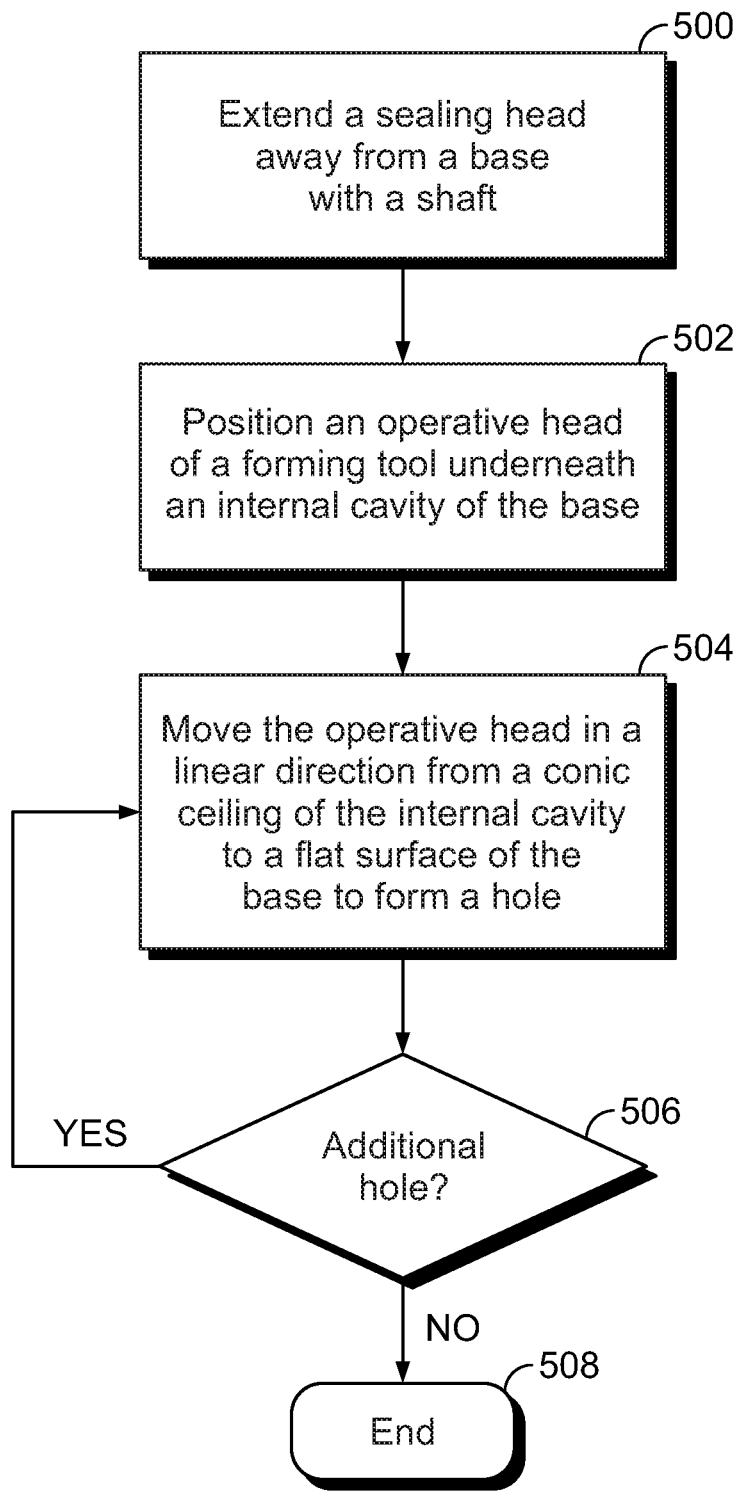
FIG. 16 illustrates a flow chart of a method of forming a poppet of a check valve, according to an embodiment of present disclosure.

FIG. 16 illustrates a flow chart of a method of forming a poppet of a check valve, according to an embodiment of present disclosure. At 500, the poppet is formed by initially extending a sealing head away from a base with a shaft. At 502, an operative head of a forming tool (such as a drill) is positioned underneath an internal cavity of the base. At 504, the operative head is moved in a linear direction from a ceiling of the internal cavity to a flat surface of the base to form a hole. In an example, the operative head is moved in a linear direction from a conic ceiling of the internal cavity to a flat surface of the base to form the hole. In an example, the operative head is moved in a linear direction from a flat ceiling of the internal cavity to a flat surface of the base to form the hole. At 506, it is determined if an additional hole is desired. If so, the method returns to 504. If not, the method ends at 508.

Figure 17:
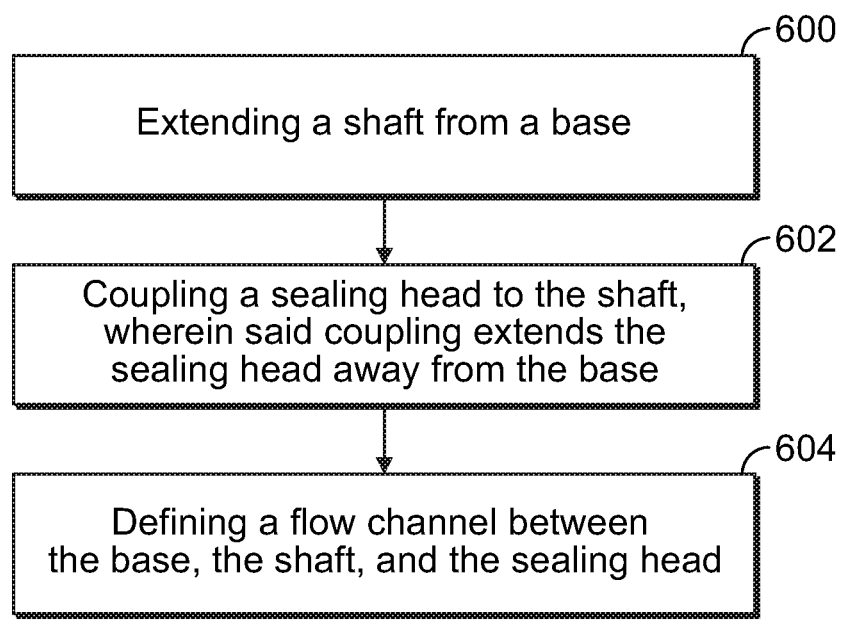
FIG. 17 illustrates a flow chart of a method of forming a poppet of a check valve, according to an embodiment of the present disclosure.

FIG. 17 illustrates a flow chart of a method of forming a poppet of a check valve, according to an embodiment of the present disclosure. The method includes extending, at 600, a shaft from a base; coupling, at 602, a sealing head to the shaft, wherein said coupling extends the sealing head away from the base; and defining, at 604, a flow channel between the base, the shaft, and the sealing head.

In an example, the method also includes forming a plurality of holes in the base.

In an example, said forming includes forming the plurality of holes through a flat surface of the base; and extending the plurality of holes to an internal cavity of the base. In an example, said forming includes linearly forming the plurality of holes by a forming tool operating from the internal cavity to and through the flat surface of the base. In an example, the method also includes forming the internal cavity with a conic ceiling.

In an example, said forming includes positioning the plurality of holes around a root of the shaft that connects to the base.

In an example, said extending includes axially centering the shaft about a longitudinal axis of the poppet.

In an example, the shaft has a first diameter, and the sealing head has a second diameter that is greater than the first diameter.

In an example, the method also includes forming at least one orifice through a portion of the sealing head.

As described herein, embodiments of the present disclosure provide poppets for check valves that can be efficiently and cost-effectively manufactured. Further, embodiments of the present disclosure provide simplified poppets that can be quickly and easily manufactured without the need for specialized tooling.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A poppet of a check valve, the poppet comprising:
 a base comprising an internal cavity having a ceiling that is conic, and a plurality of holes to counterbalance back pressure for the check valve, wherein the plurality of holes extend through a flat surface of the base;
 a shaft extending from the flat surface of the base; and
 a sealing head coupled to the shaft and extended away from the base by the shaft, wherein a flow channel is defined between the base, the shaft, and the sealing head.

2. The poppet of claim 1, wherein the plurality of holes extend to the internal cavity of the base.

3. The poppet of claim 2, wherein each of the plurality of holes has a central axis that is perpendicular to the flat surface of the base.

4. The poppet of claim 1, wherein the plurality of holes are positioned around a root of the shaft that connects to the base.

5. The poppet of claim 1, wherein the shaft is axially centered about a longitudinal axis of the poppet.

6. The poppet of claim 1, wherein the shaft has a first diameter, and the sealing head has a second diameter that is greater than the first diameter.

7. The poppet of claim 1, wherein the sealing head comprises at least one orifice for restricted flow.

8. The poppet of claim 1, wherein the poppet is disposed in a check valve for a hydraulic system for landing gear of an aircraft.

9. The poppet of claim 1, wherein the plurality of holes comprise:
 a flat circular end formed through the flat surface of the base; and
 an opposite angled end formed through the ceiling.

10. A method of forming a poppet of a check valve, the method comprising:
- forming an internal cavity of a base with a ceiling that is conic;
- forming a plurality of holes in the base, wherein said forming the plurality of holes comprises forming the plurality of holes through a flat surface of the base, and extending the plurality of holes to the internal cavity of the base;
- extending a shaft from the base;
- coupling a sealing head to the shaft, wherein said coupling extends the sealing head away from the base; and
- defining a flow channel between the base, the shaft, and the sealing head.

11. The method of claim 10, wherein said forming the plurality of holes further comprises linearly forming the plurality of holes by a forming tool operating from the internal cavity to and through the flat surface of the base.

12. The method of claim 10, wherein said forming the plurality of holes further comprises positioning the plurality of holes around a root of the shaft that connects to the base.

13. The method of claim 10, wherein said extending comprises axially centering the shaft about a longitudinal axis of the poppet.

14. The method of claim 10, wherein the shaft has a first diameter, and the sealing head has a second diameter that is greater than the first diameter.

15. The method of claim 10, further comprising forming at least one orifice through a portion of the sealing head.

16. The method of claim 10, wherein said forming the plurality of holes further comprises:
- forming flat circular ends through the flat surface of the base; and
- forming opposite angled ends through the ceiling.

17. A check valve comprising:
- a housing having a central chamber;
- a spring seat secured within the central chamber;
- a biasing spring extending from the spring seat; and
- a poppet secured within the central chamber, wherein the biasing spring exerts a biasing force into the poppet, wherein the poppet comprises:
  - a base comprising a plurality of holes that extend through a flat surface to an internal cavity of the base, wherein each of the plurality of holes has a central axis that is perpendicular to the flat surface of the base;
  - a shaft extending from the flat surface of the base, wherein the plurality of holes are positioned around a root of the shaft that connects to the base, wherein the shaft has a first diameter; and
  - a sealing head coupled to the shaft and extended away from the base by the shaft, wherein the sealing head has a second diameter that is greater than the first diameter, and wherein a flow channel is defined between the base, the shaft, and the sealing head.

18. The check valve of claim 17, wherein the shaft is axially centered about a longitudinal axis of the poppet.

19. The check valve of claim 17, wherein the sealing head comprises at least one orifice for restricted flow.

20. The check valve of claim 17, wherein the internal cavity of the base has a ceiling that is conic.

21. The check valve of claim 20, wherein the plurality of holes comprise:
- a flat circular end formed through the flat surface of the base; and
- an opposite angled end formed through the ceiling.

* * * * *